June 26, 1951  G. M. McLEAN ET AL  2,558,451
RESILIENT VEHICLE WHEEL
Filed May 17, 1948

George M. McLean
David K. McLean
INVENTORS

Patented June 26, 1951

2,558,451

UNITED STATES PATENT OFFICE 2,558,451

RESILIENT VEHICLE WHEEL

George M. McLean, Salt Lake City, Utah, and David K. McLean, Soda Springs, Idaho Application May 17, 1948, Serial No. 27,448

1 Claim. (Cl. 152—399)

This invention relates to new and useful improvements and structural refinements in vehicle wheels, more specifically, wheels for automobiles, trucks, and similar vehicles, and the principal object of the invention is to eliminate the disadvantages and danger resulting from the so-called "blow-out" of the pneumatic tire with which such vehicle wheels are usually equipped.

This object is achieved by the provision of what may be called a resilient vehicle wheel which includes in its construction a disc-shaped wheel member formed with a transverse marginal rim, and a resilient tire mounted on the marginal rim portion of the wheel member and formed with an annular compressed air pocket, matters being so arranged that when, for any reason, the compressed air escapes from the pocket of the tire, the latter will be satisfactorily supported by the marginal rim of the wheel member, permitting the vehicle to be driven without damage to the tire or wheel member even though the air in the tire has escaped.

An important feature of the invention resides in its simplicity of construction and in the ease and convenience with which the tire may be mounted on or separated from the wheel member itself.

An additional feature of the invention resides, as aforesaid, in its safe and dependable operation, and in its ability to effectively absorb road shocks without transmitting them to the vehicle.

With the above more important objects and features in view and such other objects and features as may become apparent as this specification proceeds, the invention consists essentially of the arrangement and construction of parts as illustrated in the accompanying drawing, in which—

Like characters of reference are employed to designate like parts in the specification and throughout the several views.

Figure 1:
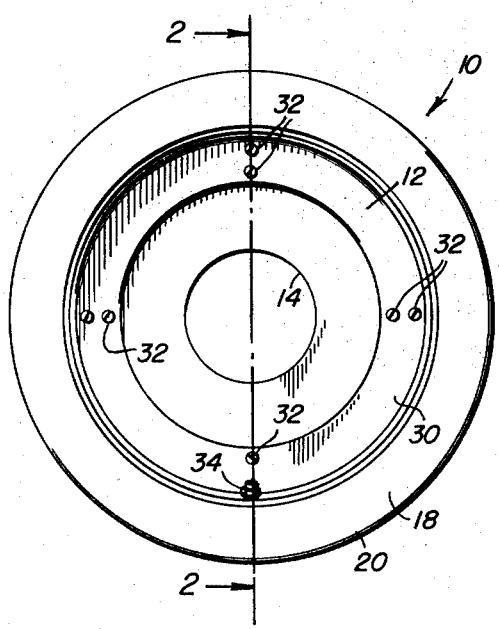
Figure 1 is a side elevational view of the invention.

Referring now to the accompanying drawing in detail, the invention consists of a resilient vehicle wheel designated generally by the reference character 10, the same embodying in its construction a disc-shaped wheel member 12 provided with a central hub opening 14, so that it may be mounted in any suitable manner upon any conventional wheel hub (not shown).

Figure 2:
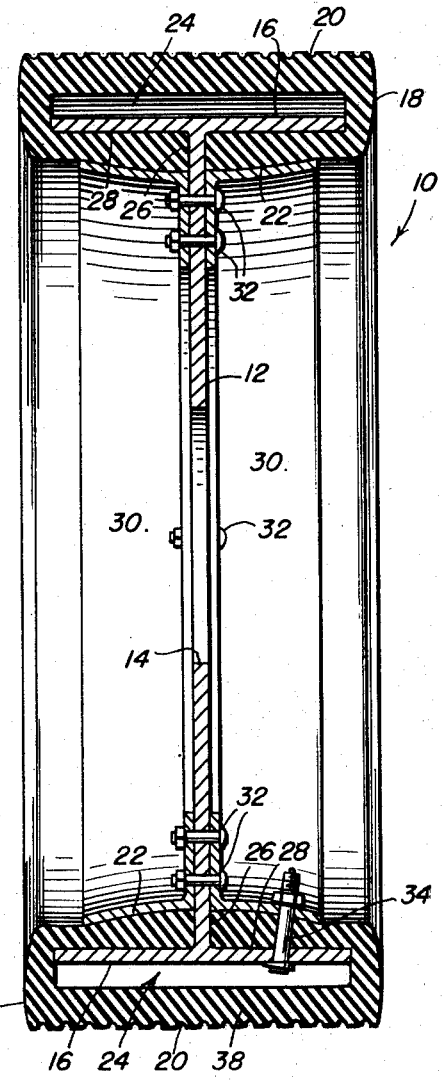
Figure 2 is a cross sectional view, taken substantially in the plane of the line 2—2 in Figure 1.
Figure 3:
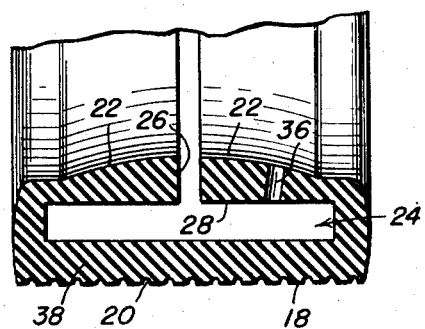
Figure 3 is a fragmentary cross sectional view of the tire per se used in the invention.

A transversely extending marginal rim 16 is provided at the circumference of the wheel member 12, the rim 16 extending laterally to both sides of the wheel member, whereby the marginal edge portion of the wheel member assumes a substantially T-shaped cross sectional configuration, as is best shown in Figure 2.

A resilient tire 18 is provided on the outer circumferential surface thereof with a suitable tread 20, while the inner circumferential surface of the tire is inwardly convexed, as indicated at 22. The tire 18 is also formed with a transverse, annularly extending compressed air pocket 24 and with a central, circular or annular slot 26 which extends from the pocket 24 to the inner circumferential surface 22 of the tire.

The slot 26 is extended to receive a marginal portion of the wheel member 12, while the rim 16 of the wheel member is receivable within the pocket 24, as indicated in Figure 2. It is to be noted that the rim 16 is disposed immediately adjacent the inner circumferential wall 28 of the pocket 24, and it should be understood that the tire 18 possesses efficient flexibility and resiliency so as to facilitate its mounting upon the rim 16 as described. In other words, the inner circumferential portions of the tire at the sides of the slot 26 may be spread apart so as to facilitate insertion of the rim 16 into the pocket 24, as will be clearly apparent.

Means are provided for demountably retaining the tire 18 in position on the wheel member 12, these means including a pair of retainer rings 30 which are of a substantially L-shaped cross sectional configuration and are removably secured to the opposite sides of the wheel member 12 by suitable bolts 32. The circumferential portions of the rings 30 are convexo-concaved as shown and supportably engage the convex circumferential surfaces 22 of the tire 18, whereby the tire is firmly yet demountably retained in position on the wheel member.

The pocket 24 of the tire 18 may be charged with compressed air through the medium of a valve stem 34 which communicates with the pocket 24 and extends outwardly through suitable apertures formed in the rim 16 and in one of the rings 30 and also through a bore 36 provided in the tire 18.

When the invention is placed in use, the tire 18 is filled with compressed air, so that under normal conditions the pocket 24 will be "inflated" and the wheel will possess efficient shock absorbing characteristics.

However, if the tire 18 is punctured or if for some other reason compressed air escapes from the pocket 24, the outer circumferential portion 38 of the tire will simply collapse into supportable engagement by the rim 16, permitting the vehicle to be driven without damage to the tire or to the wheel member, or without subjecting the vehicle and its occupants to danger and possible injury, as occurred upon a "blow out" of conventional pneumatic tire.

It is believed that the advantages and use of the invention will be clearly apparent from the foregoing disclosure and accordingly, further description thereof at this point is deemed unnecessary.

While in the foregoing there has been shown and described the preferred embodiment of this invention it is to be understood that minor changes in the details of construction and arrangement of parts may be resorted to without departing from the spirit and scope of the invention as claimed.

Having described the invention, what is claimed as new is:

In a resilient vehicle wheel, the combination of a tubeless tire formed from resilient material and having a substantially rectangular and horizontally elongated cross-section, said tire including spaced inner and outer walls affording therebetween a horizontally elongated air chamber, the inner wall being provided, intermediate side edges thereof, with an annular slot communicating with said chamber, and a wheel member comprising a disc-shaped body having an imperforate peripheral portion, a transverse rim provided at the periphery of said body and extending to both sides therefrom, the peripheral portion of said body being disposed in said slot, said rim being disposed entirely in said chamber in abutment with the inner surface of said inner wall and in spaced relation from said outer wall to afford a compressed air chamber therebetween, and a pair of tire retaining rings secured to opposite side surfaces of the peripheral portion of said body, said rings having laterally projecting circumferential flanges in clamping engagement with portions of said inner wall at the opposite sides of said slot.

GEORGE M. McLEAN.
DAVID K. McLEAN.

REFERENCES CITED

The following references are of record in the file of this patent:

UNITED STATES PATENTS

| Number | Name | Date |
|---|---|---|
| 503,660 | Glen et al. | Aug. 22, 1893 |
| 658,338 | Byers | Sept. 25, 1900 |
| 744,493 | Connable | Nov. 17, 1903 |
| 1,177,350 | Monson | Mar. 28, 1916 |
| 1,323,457 | Holczer | Dec. 2, 1919 |
| 1,462,117 | McClintock | July 17, 1923 |
| 1,492,849 | Hubbard | May 6, 1924 |
| 1,560,345 | Friend | Nov. 3, 1925 |
| 1,932,191 | Shoemaker | Oct. 24, 1933 |